March 23, 1965     R. L. VERREAULT ETAL     3,174,170
APPARATUS FOR MANUFACTURING SHOE SOLES
Filed Dec. 15, 1961     2 Sheets-Sheet 1

INVENTOR.
ROBERT L. VERREAULT
FERNAND L. LA ROCHELLE

BY *J. B. Holden*
ATTORNEY

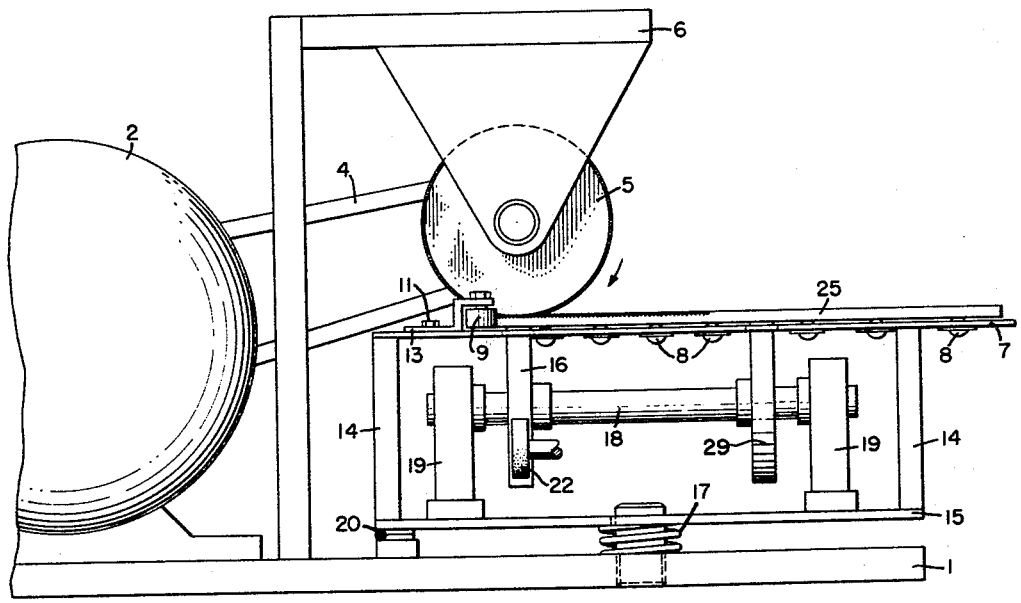
FIG. 2
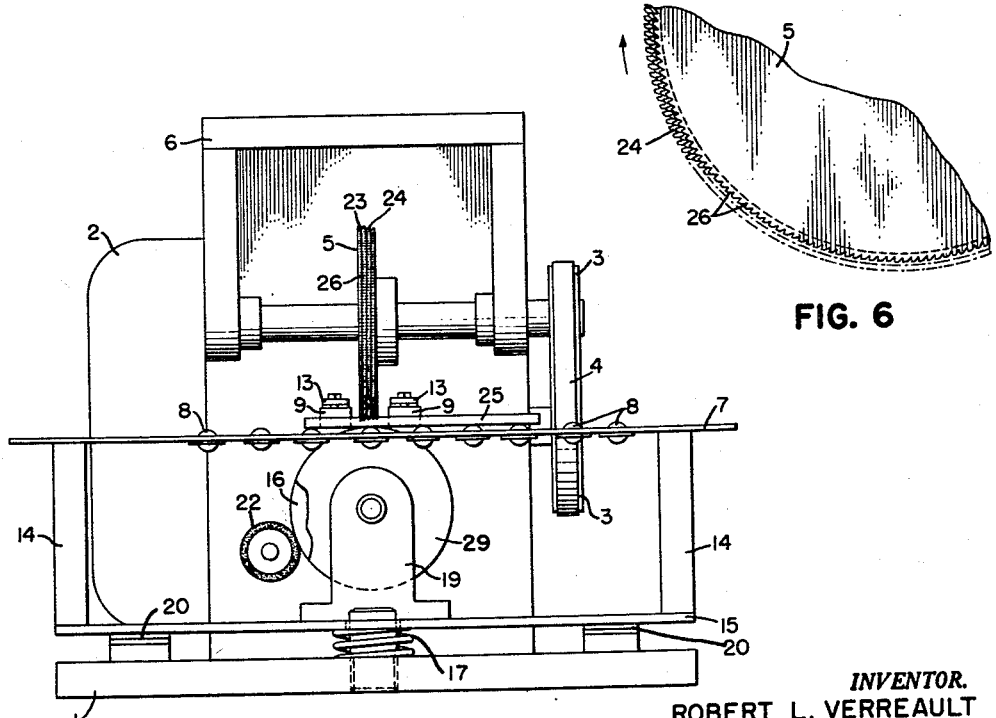
FIG. 3
FIG. 6
INVENTOR.
ROBERT L. VERREAULT
FERNAND L. LA ROCHELLE

United States Patent Office 3,174,170
Patented Mar. 23, 1965

3,174,170
APPARATUS FOR MANUFACTURING SHOE SOLES
Robert L. Verreault and Fernand L. La Rochelle, Lewiston, Maine, assignors to The Goodyear Tire & Rubber Company, Akron, Ohio, a corporation of Ohio
Filed Dec. 15, 1961, Ser. No. 159,540
3 Claims. (Cl. 12—32)

This invention relates to shoe soles and in particular to shoe soles having a wheeled edge.

It has heretofore been the custom to provide a serrated appearance on the top edge surfaces of shoe soles, which appearance is referred to in the art as a wheeled edge. In the prior art, leather soles were given such an appearance by pressing a series of substantially parallel indentations into the top edge surfaces by means, for example, of a heated wheel having a serrated circumferential surface. However, with the advent of synthetic soling material and the adhesively attached single unit sole, such a technique has proved unsatisfactory. This is primarily because such materials have what may be referred to as elastic memory and furthermore many such materials are thermoplastic at relatively low elevated temperatures. As a result, even though a pattern is impressed in such material, it tends to spring back to its original unserrated surface due to its inherent elasticity. Furthermore, when heat is applied to the sole to adhere it to an upper, its memory and thermoplastic properties enhance this tendency.

It is therefore an object of this invention to provide a method and apparatus for wheeling shoe soles so that they have a serrated top edge surface which will be permanent.

It is a further object of the present invention to provide a method and apparatus for rapidly and automatically wheeling shoe soles.

It is a still further object of the present invention to provide means for wheeling shoe soles in a variety of types and sizes.

It is an additional object of the present invention to provide a shoe sole having a wheeled edge which will endure for the service life of the sole regardless of ambient conditions.

It is another object of the present invention to provide a wheeled sole having enhanced non-scuffing and non-curling tendencies.

These and other objects of the present invention will become apparent from the following description and drawings in which:

FIG. 2 is a side view of the machine shown in FIG. 1;

FIG. 3 is an end view of the machine shown in FIGS. 1 and 2;

FIG. 6 is a view of the cutting tool utilized on the machine shown in FIG. 1.

As previously mentioned, the technique of impressing a wheeled edge on shoe soles has not been satisfactory, since materials used in shoe soling have to some degree a memory which tends to result in an erasure or fading of the pattern. This is particularly true of the newer materials which are elastomer-resin blends having excellent cushioning and wear properties but have a general tendency not to retain an impressed pattern, particularly one applied by a heated wheel. In addition, the trend towards the adhesively attached sole at temperatures of about 150° F. has compounded the difficulty. Speaking generally, the present invention solves this problem by providing a shoe sole in which the wheeled edge is sculptured into the product by excising material therefrom so that it lasts the life of the sole, even when subjected to elevated temperatures or other conditions deleterious to an impressed wheeled edge.

Figure 1:
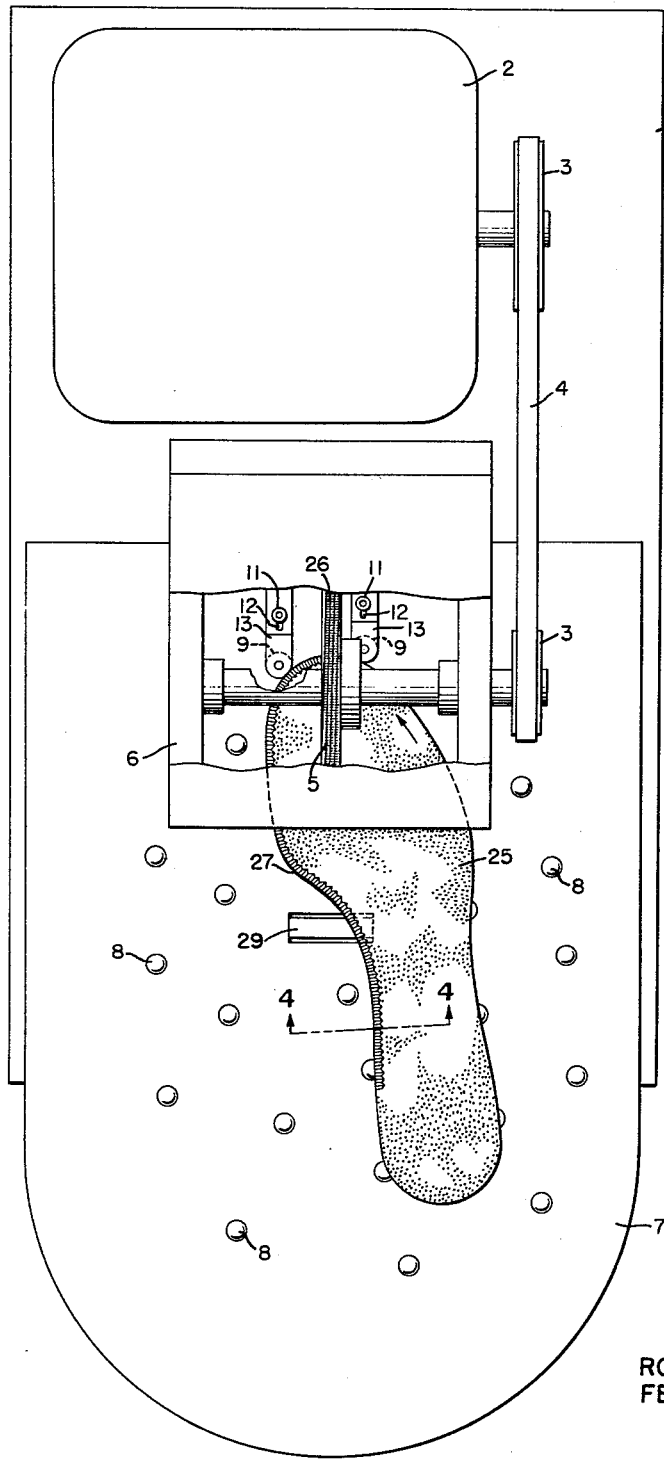
FIG. 1 is a plan view of a machine according to the present invention for permanently wheeling a shoe sole.

Referring to the drawings, the wheeling machine is mounted on a plate 1 which may set on any convenient stand or leg structure (not shown). A motor 2, mounted on plate 1, supplies power, through conventional pulleys 3 and belt 4, to drive a cutting wheel or tool 5 which is rotatably mounted in a conventional means beneath housing 6. Underneath the cutting wheel 5 and adjacent thereto is a table 7 having a plurality of spaced bearings 8 mounted in the top surface thereof. Adjacent the sides of and at the rearward edge of the cutting tool 5 are two horizontally disposed bearings 9 mounted on table 7 by conventionally disposed bolts and nuts 11 through slots 12 in the brackets 13 of bearings 9. As shown in FIGS. 2 and 3 the table 7 includes side members 14 and bottom member 15 forming a generally rectangular housing on which may be mounted bearings 8 and variable speed drive wheel 16 and its associated power source (FIG. 3). The housing thus formed is supported on plate 1 by springs 17 so that the entire housing is urged upwardly towards cutter 5. Hinge members such as 20 provide stability to the housing. As shown in FIG. 2, bearings 29 may be rotatably mounted on a shaft 18 journaled to upright supports 19. However, the bearings are preferably free to move independently of one another and, hence, are preferably individually mounted roller or ball bearings such as shown in FIGS. 1 and 3.

An auxiliary, variable speed drive wheel 16 is mounted on bottom 15 in conventionally journaled uprights 19 (FIG. 3) and driven by a friction drive wheel 22 and a motor (not shown). Wheel 16 is positioned so that it is at 90 degrees to the cutter 5 and its axis of rotation lies in a plane normal to the axis of rotation of said cutter. Through a proper choice of the rotational speeds of wheel 16 and cutter 5, the number of serrations per inch of sole edge may be widely varied. As will further appear, the cutter 5 may be designed to provide sharp relatively large serrations as desired for men's shoes or delicate, closely spaced serrulate excisions for fashionable women's shoe soles.

The unique wheeled edge is provided by the cutting tool 5 which excises material in the selected areas of the shoe sole, rapidly and continuously in such a fashion that a sculptured wheeled edge appears, having a sharp, pleasing profile. The cutter 5 comprises a wheel or disk having a relatively narrow peripheral surface on which is raised a helical cutting ridge or land 23 whose height determines the maximum depth of cut and whose laterally spacing or pitch determine, at least partially, the number of serrations per inch on the sole. The helical cutting land is tapered in height from the beginning towards the center of the helix, much like a pipe thread, to provide a tapered profile as at 24 which assists in automatically feeding the shoe sole 25 through the cutter. In addition, the land is serrated or notched transversely as at 26 to provide a sawtooth action by the cutter. The serrations or notches 26 may extend to the entire depth of the land or thread, but need not do so, depending on the depth of cut or "bite" that is desired. The cutter 5 may be provided with a profile such as seen in FIG. 6 so that the major portion of the serration is cut by the initial relatively short length of the land and the latter portions of the cutting edges are more in the nature of finishers. The cutter 5 may be made of a variety of materials, but is preferably carbide steel tipped to prolong life of the cutter since many soling materials, while in themselves fairly soft, are highly abrasive due to the high loadings of clay and other additives. A cutter of the type described excises material from the sole by a combination of cutting and abrading but may be designed to produce either type of action predominately.

Figure 4:
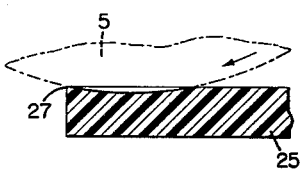
FIG. 4 is a partial section of a sole being wheeled.
Figure 5:
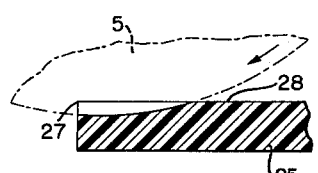
FIG. 5 is a modification of FIG. 4.

As will be seen from an examination of the drawings, the operation of the machine is as follows:

The sole 25 is placed on the bearings 8 and 29 positioned between the edge cutter 5 and variable speed drive wheel 16 until the edge of the sole contacts the paired bearings 9. The action of the cutter is to bite into the sole edge, and due to its helical design, it cuts the serrations forming the wheeled edge and at the same time, with the aid of the drive wheel 16, advances the sole until the desired portion of the edge is wheeled. It is obvious, of course, that a portion or all of the sole edge may be wheeled depending on the end use of the product and the type of heel to be used. The direction of rotation of the cutter 5 and drive wheel 16 are shown by arrows, said rotation insuring that the sole is constantly urged against the bearings 9 and constant and steady advance of the piece is achieved. The bearings 9 may be adjusted both in spacing and relative position, not only to accommodate a number and variety of soles, but to provide a number of effects. As shown in FIGS. 4 and 5, the relative position of the bearings 9 with respect to cutter 5 may be set so that the maximum depth of cut is well inside the edge 27 of sole 25 with the cut rising to essentially zero depth at or adjacent the edge 27 as shown. This provides a sharp wheeled appearance, while maintaining a full structural thickness and strength at the sole edge, which reduces the possibility of scuff damage to the sole. In addition, by moving the tool slightly inwardly, an attractive edge may be left on the top edge of the sole while at the same time providing additional reinforcement to the edge as an anti-scuff measure. As shown in FIG. 5, the bearings 9 may be advanced along the sides of the cutter 5 so that the greatest depth of cut coincides with edge 27. This sets forth the wheeled edge in bold relief while providing maximum flat surface at 28 for adhesively attaching the sole to the upper part of the shoe. However, the point of contact with the cutter must be sufficiently inside the edge portion 27 to insure that the sole is constantly urged against bearings 9 and will feed automatically.

An additional advantage of a sole having a wheeled edge according to the present invention is that the arcuate cross-section of the serrations tends to resist curl since any movement to curl places the material along the inner arcuate portion in compression. Furthermore, the arcuate nature of the serrations tends to distribute stresses more evenly, as compared to a serration having a rectangular cross-section, and thereby reduces local strains in the sole during attachment under pressure and subsequent service conditions.

As previously mentioned, the device and method of the present invention may be used advantageously on a variety of shoe sole materials and produces a superior wheeled sole even in leather, as compared with the compression method. However, it is particularly useful with composition or plastic soling materials having high elastic memory tendencies such as elastomer-resin blends comprising a blend of a styrene resin and a butadiene rubber. An example of such a material is formulated as follows:

| | Parts (wt.) |
|---|---|
| SBR rubber (butadiene/styrene; 75/25) | 100.00 |
| Resin (styrene/butadiene; 80/20) | 50.00 |
| Zinc oxide | 5.00 |
| Stearic acid | 1.00 |
| Calcium silicate | 75.00 |
| Process oil | 5.00 |
| Paraffin wax | 1.50 |
| Accelerator (Altax) | 2.00 |
| Methyl tuads | 0.25 |
| Sulfur | 3.00 |

Other materials used in shoe soles such as rubber compounded and filled for high wear qualities, or blends of a nitrile rubber with a vinyl, such as polyvinylchloride, may be wheeled in accordance with the present invention to produce an improved sole.

While certain representative embodiments and details have been shown for the purpose of illustrating the invention, it will be apparent to those skilled in this art that various changes and modifications may be made therein without departing from the spirit or scope of the invention.

We claim:
1. A device for wheeling a shoe sole surface so that the pattern formed thereby will last for the operative life of the sole, comprising support means for a sole, rotary cutting means adjacent said support means to cut into the surface of said sole a plurality of serrations forming the wheeling thereon, stop means adjacent said cutting means to position a sole in relationship thereto; and a rotary drive wheel adapted to move said sole in relation to said cutting means during the wheeling operation, means mounting said drive wheel so that its axis of rotation lies in a plane normal to the axis of rotation of said cutting means.

2. A device for wheeling a shoe sole surface so that the pattern formed thereby will last for the operative life of the sole, comprising support means for a sole, a rotary cutting wheel having on its periphery a raised helically disposed land having a plurality of transverse serrations therein to cut into the surface of said sole a plurality of serrations forming the wheeling thereon, stop means adjacent said cutting means to position a sole in relationship thereto; and a rotary drive wheel adapted to move said sole in relation to said cutting means during the wheeling operation, means mounting said drive wheel so that its axis of rotation lies in a plane normal to the axis of rotation of said cutting means.

3. A device for wheeling a shoe sole surface so that the pattern formed thereby will last for the operative life of the sole, comprising support means for a sole, rotary cutting means adjacent said support means to cut into the surface of said sole a plurality of serrations forming the wheeling thereon, stop means adjacent said cutting means to position a sole in relationship thereto, a rotary drive wheel adapted to move said sole in relation to said cutting means during the wheeling operation, means mounting said drive wheel and support means for resilient adjustment with respect to the cutting means; and means mounting said drive wheel so that its axis of rotation lies in a plane normal to the axis of rotation of said cutting means.

References Cited by the Examiner
UNITED STATES PATENTS

| 1,208,079 | 12/16 | Basler | 12—32 |
|---|---|---|---|
| 1,376,474 | 5/21 | Sorensen | 12—32 |
| 1,500,263 | 7/24 | Perrault | 12—17 |
| 2,020,969 | 11/35 | Saladino | 36—25 |
| 2,377,377 | 6/45 | Sandberg | 12—32 |
| 2,431,170 | 11/47 | Gargan | 12—146 |
| 2,574,611 | 11/51 | Baker | 12—32 |
| 2,648,855 | 8/53 | Midgley et al. | 12—146 |
| 2,936,535 | 5/60 | Heider | 36—25 |
| 3,064,460 | 11/62 | Dziadulonis | 12—17 X |

JORDAN FRANKLIN, *Primary Examiner.*

EDWARD V. BENHAM, DAVID J. WILLIAMOWSKY, *Examiners.*